United States Patent
Takahashi

(10) Patent No.: US 7,222,829 B2
(45) Date of Patent: May 29, 2007

(54) ANTENNA MOUNTING STRUCTURE

(75) Inventor: Motonao Takahashi, Gunma (JP)

(73) Assignee: Yokowo Co., Ltd., Tokyo (JP)

( * ) Notice: Subject to any disclaimer, the term of this patent is extended or adjusted under 35 U.S.C. 154(b) by 85 days.

(21) Appl. No.: 10/886,700

(22) Filed: Jul. 9, 2004

(65) Prior Publication Data

US 2005/0006540 A1 Jan. 13, 2005

(30) Foreign Application Priority Data

Jul. 10, 2003 (JP) ............................ P2003-195154

(51) Int. Cl.
*A47F 5/08* (2006.01)
(52) U.S. Cl. .................. 248/231.9; 343/713; 411/209; 411/417
(58) Field of Classification Search ............... 411/197, 411/368, 999, 526, 418, 419, 353, 209, 221, 411/383, 417, 508, 913; 343/713, 878, 711, 343/717, 718, 892, 906, 872, 715, 900; 403/329, 403/11, 12
See application file for complete search history.

(56) References Cited

U.S. PATENT DOCUMENTS 913,486 A * 2/1909 Ferguson .................... 411/197
995,760 A * 6/1911 Anderson ................... 411/123
6,095,735 A * 8/2000 Weinstein et al. ........... 411/221
6,762,727 B2 * 7/2004 Rochford et al. ........... 343/713

FOREIGN PATENT DOCUMENTS

JP         B2-2751146         2/1998

* cited by examiner

*Primary Examiner*—Gwendolyn Baxter
(74) *Attorney, Agent, or Firm*—Morgan, Lewis & Bockius LLP

(57) ABSTRACT

For mounting an antenna device on a first side of a panel body, a mount screw is protruded from the antenna device and formed with a slit extending from a distal end face thereof in an axial direction thereof. A washer has a first engagement member extended from a main body. The washer is adapted to be fitted with the mount screw such that the first engagement member is inserted into the slit from the distal end face of the mount screw in a first direction. A second engagement member is provided in the slit, and elastically deformable so as to allow the first engagement member to move within the slit in the first direction. The second engagement member is adapted to engage with the first engagement member at a first position within the slit so as to prevent the first engagement member from moving in a second direction which is opposite to the first direction. A nut is adapted to be screwed to the mount screw while being interconnected with the washer.

13 Claims, 6 Drawing Sheets

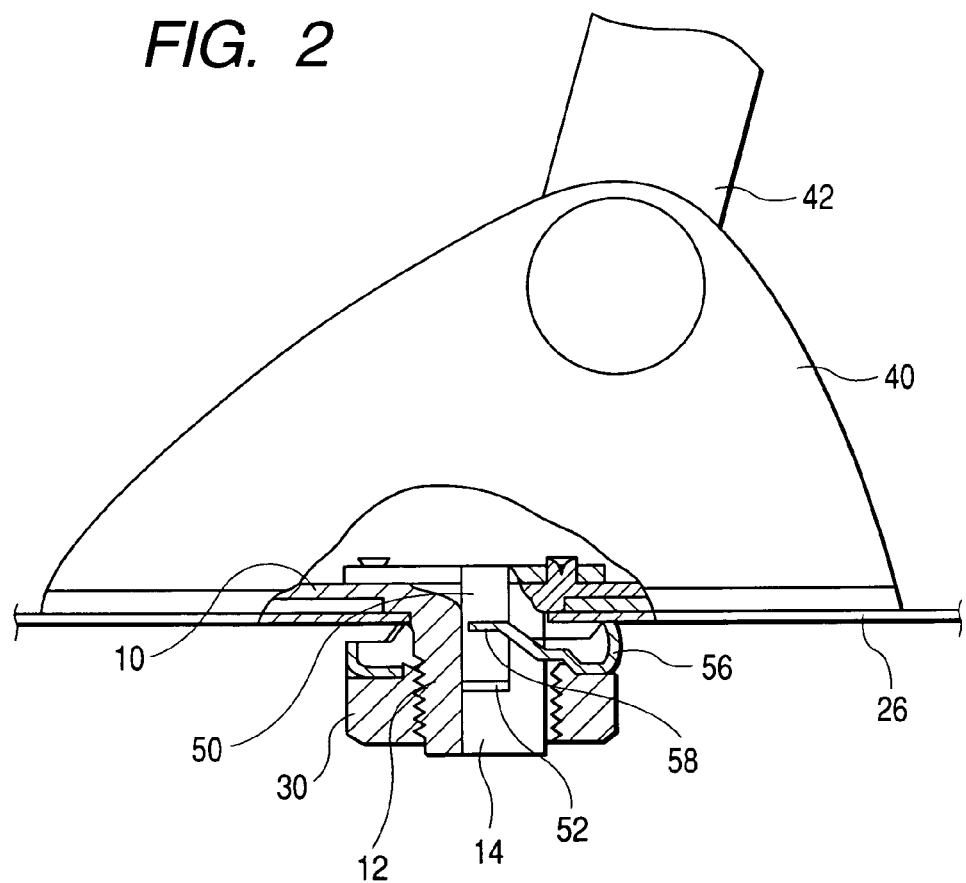
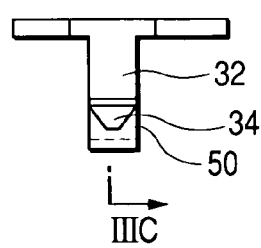
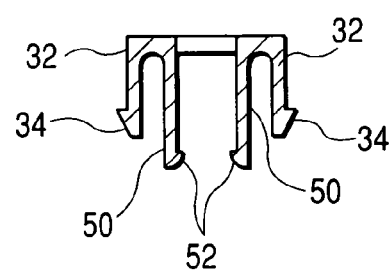
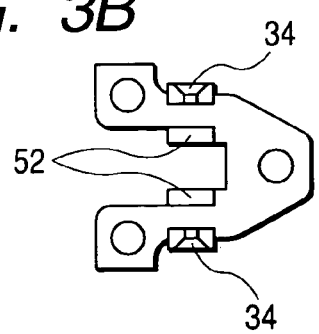

ANTENNA MOUNTING STRUCTURE

BACKGROUND OF THE INVENTION

The present invention relates to an antenna mounting structure for mounting an antenna base to a roof panel or the like of a vehicle body.

In a conventional structure for mounting an antenna device for a vehicle to a roof panel of a vehicle body, a mount screw protruded downward from an antenna base of the antenna device is inserted through a mount hole formed on the roof panel, and a washer having a daw is fitted and inserted from below into the mount screw protruded downward from the roof panel, and furthermore, a nut is screwed and fixed.

In order to enhance a workability, the washer having a claw and the nut are coupled and integrated so as to be relatively rotatable around a screw axis and not to be separated from each other in the direction of the screw axis. In order to further enhance the workability, Japanese Patent No. 2751146 teaches a structure capable of provisionally fixing a nut to a mount screw through a washer having a claw and preventing the nut from slipping from the mount screw after the provisional fixation even if an operator releases his or her hand from the nut. In this structure, a slit is formed on the mount screw so as to extend in the direction of the screw axis and the washer is provided with a fitting piece to be elastically deformed and press-fitted into the slit. The nut is coupled to the washer.

In this structure, if the width of the slit or fitting piece to be provided on the mount screw has a dimensional variation in a manufacture, however, there is an anxiety that the press-fitting for the provisional fixation might not be carried out or an elastic force for holding the nut on the mount screw by the provisional fixation might be reduced to cause the nut to slip off. Therefore, it is necessary to carry out the manufacture by setting the widths of the slit of the mount screw and the fitting piece of the washer with high dimensional precision.

In order to solve the above problem, there is proposed a related-art structure shown in FIGS. 7A through 9B.

As shown in FIGS. 7A and 7B, a mount screw 12 is protruded downward from an antenna base 10. The mount screw 12 is provided with a slit 14 extending in the direction of a screw axis from a lower surface thereof. An engaging plate 16 shown in FIG. 8 is fixed to the lower end face of the mount screw 12 by caulking or the like. The engaging plate 16 is formed by a resin plate in which a cutout 18 and elastic pieces 20 protruded from edges of the cutout 18. The pieces 20 are configured to be elastically deformed in the direction of the screw axis. As shown in FIGS. 9A and 9B, a washer 22 is provided with an engaging piece 24. When the washer 22 is fitted with the mount screw 12, the engaging piece 24 is inserted into the slit 14 while deforming the elastic pieces 20. After the fitting, the engaging piece 24 is prevented from moving downward by the elastic pieces 20 to establish a provisional fixation. The washer 22 is provided with claws 28 to cut into a roof panel 26 of a vehicle to carry out an electrical connection. A nut 30 is coupled to the washer 22 so as to be relatively rotatable around the screw axis and not to be separated from each other in the direction of the screw axis.

A holder 32 formed of a resin having elasticity is fixed integrally with the antenna base 10 by caulking or the like. The holder 32 is formed with elastic holder arms 35 having, on tip portions thereof, hooks 34 directed outward. By inserting the holder 32 into a mount hole 36 provided on the roof panel 26 such that the hooks 34 engage with the edge of the mount hole 36, the antenna device is prevented from being slipped off. A rubber base 38 serving as a sealing member is provided between the antenna 10 and the roof panel 26. Moreover, the elastic pieces 20 of the engaging plate 16 are configured such that they are not elastically deformed by the weights of the washer 22 and the nut 30 and the washer 22 is prevented from slipping off by only a weight. A housing 40 is formed integrally with the antenna base 10 by insert molding. An antenna element 42 is pivotably fixed to the housing 40.

Even if an operator releases his or her hand in the provisional fixing state, the nut 30 does not slip downward so that a workability can be improved. Moreover, a force for provisionally fixing and holding the nut 30 is generated because the elastic pieces 20 of the engaging plate 16 are not elastically deformed by only the weights of the washer 22 and the nut 30, and is not greatly influenced by dimensional precision. For this reason, a member requiring the dimensional precision is not provided so that the manufacturing cost can be reduced.

However, since there is a great play between the nut 30 and the mount screw 12 when the provisional fixation is established, it is sometimes difficult to align the axes of the nut 30 and the mount screw 12 when the nut 30 is screwed on the mount screw 12, thereby lowering the workability. Further, in a case where a force or impact in the direction perpendicular to the direction of the screw axis is applied, the engaging piece 24 is easily slipped off from the slit 14, so that the nut 30 is shifted from the proper position relative to the mount screw 12.

SUMMARY OF THE INVENTION

It is therefore an object of the invention to provide an antenna mounting structure capable of preventing a nut and a mount screw from being shifted from each other when they are in a provisional fixation state, thereby securing the screwing operation of the nut with respect to the mount screw.

In order to achieve the above object, according to the invention, there is provided a structure for mounting an antenna device on a first side of a panel body, comprising:

a mount screw, protruded from the antenna device so as to extend to a second side of the panel body through an opening formed in the panel body, the mount screw being formed with a slit extending from a distal end face thereof in an axial direction thereof;

a washer, comprising a main body and a first engagement member extended from the main body, the washer being adapted to be fitted with the mount screw such that the first engagement member is inserted into the slit from the distal end face of the mount screw in a first direction;

a second engagement member, provided in the slit, and being elastically deformable so as to allow the first engagement member to move within the slit in the first direction, the second engagement member being adapted to engage with the first engagement member at a first position within the slit so as to prevent the first engagement member from moving in a second direction which is opposite to the first direction; and a nut, adapted to be screwed to the mount screw while being interconnected with the washer.

With this configuration, since the first engagement member is moved to the first position while elastically deforming the second engagement member in order to place the nut in a provisional fixation state with respect to the mount screw, dimensional precision for components is not so critical.

Preferably, a distal end of the first engagement member is situated at a position closer to the panel body than a face of the main body facing the panel body.

With this configuration, since the washer is hung on the second engagement member, the nut interconnected with the washer can be easily aligned with the mount screw.

Preferably, the second engagement member comprises: a pair of arm members, being deformable elastically in a third direction which is orthogonal to the first direction and the second direction; and a hook member, provided at a distal end portion of each of the arm members having a face extending in the third direction to retain the first engagement member at the first position.

With this configuration, the first engagement member can be reliably prevented from moving in the second direction. That is, the washer and the nut can be reliably prevented from slipping off the mount screw.

Preferably, the nut and the mount screw is partially fitted to each other when the first engagement member is retained at the first position.

With this configuration, the nut in the provisional fixation state will not move in a direction orthogonal to the first and second directions. That is, the first engagement member will not come off the slit. Further, the alignment between the nut and the mount screw can be easily and reliably attained.

Preferably, a holder is fitted into the opening to prevent the antenna device from slipping off the panel body. Here, the second engagement member is monolithically formed with the holder.

With this configuration, it is possible to manufacture the antenna mounting structure inexpensively without increasing the number of components. In addition, the second engaging member can be formed by resin molding and is thus suitable for a mass production.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a partial section view of the antenna mounting structure, showing a state that the nut is plenarily fixed with respect to the mount screw;

FIG. 3A is a side view of a holder in the antenna mounting structure of FIG. 1A;

FIG. 3B is a bottom view of the holder;

FIG. 3C is a section view taken along a line IIIC—IIIC in FIG. 3A;

DETAILED DESCRIPTION OF THE INVENTION

Figure 1A:
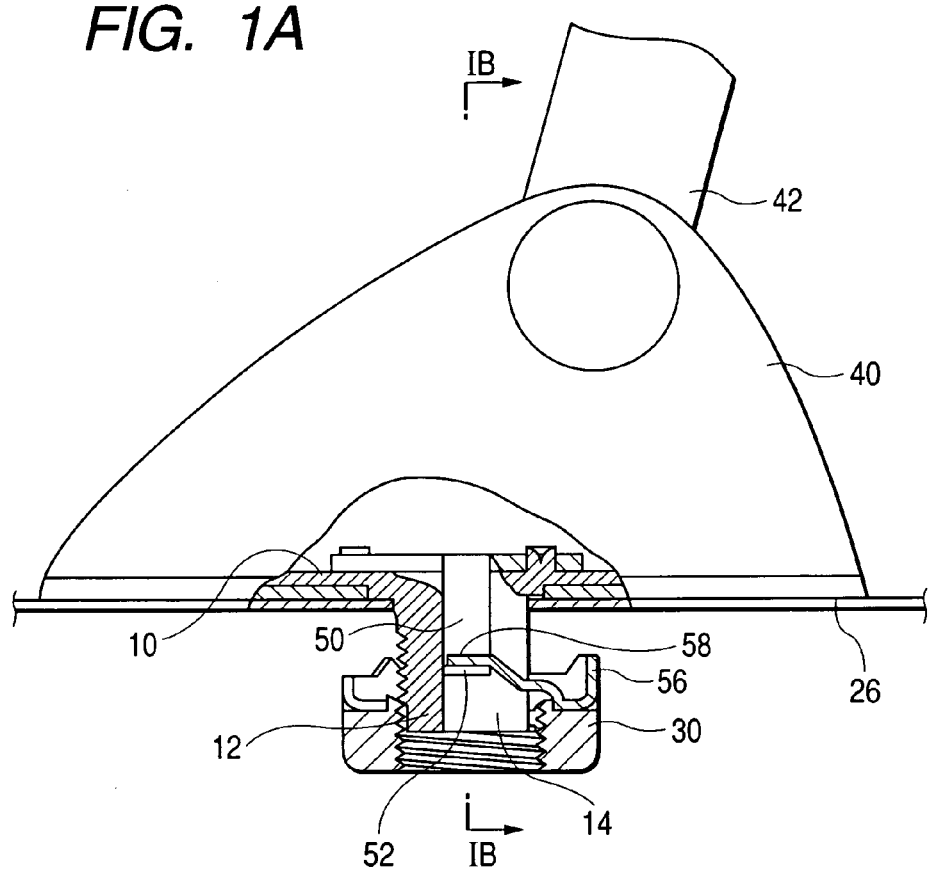
FIG. 1A is a partial section view of an antenna mounting structure according to one embodiment of the invention, showing a state that a nut is provisionally fixed with respect to a mount screw.

One preferred embodiment of the invention will be described below in detail with reference to the accompanying drawings. In FIGS. 1A through 6B, the members similar to those shown in FIGS. 7A through 9B will be designated by the same reference numerals and repetitive description for those will be omitted.

In this embodiment, as shown in FIGS. 3A to 3C, engaging arms 50 are molded integrally with a holder 32 by a resin material having elasticity. A hook 52 is formed on a tip end portion of each of the engaging arms 50 so as to direct inward.

Figure 1B:
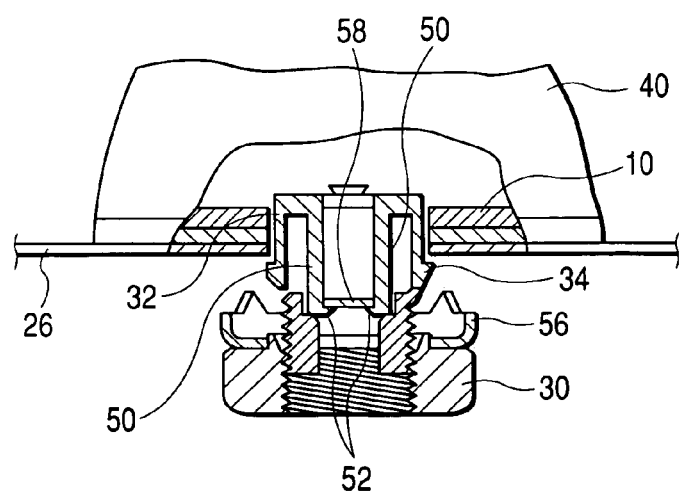
FIG. 1B is a partial section view taken along a line IB—IB in FIG. 1A.
Figure 4A:
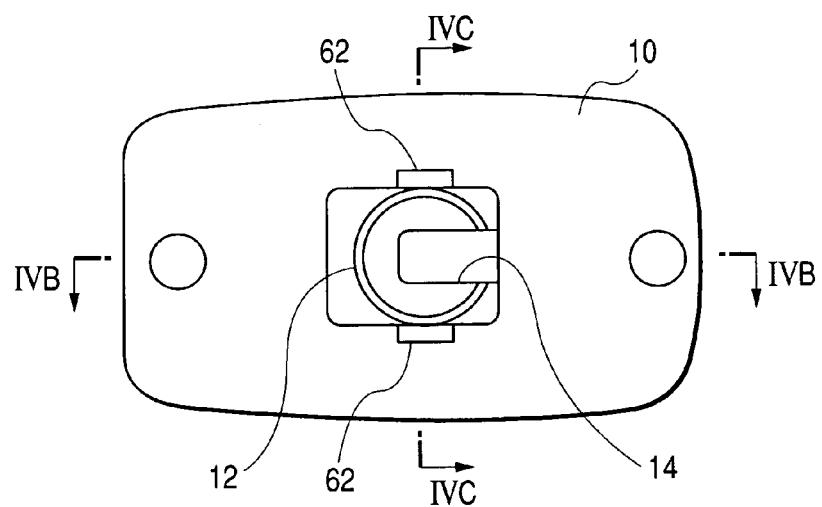
FIG. 4A is a bottom view of the mount screw.
Figure 4B:
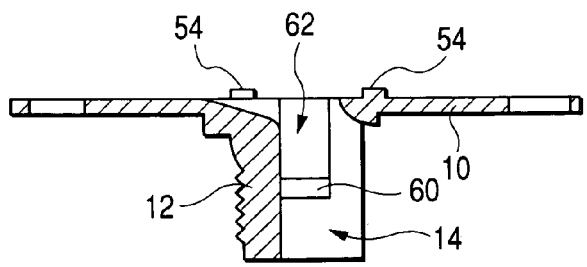
FIG. 4B is a section view taken along a line IVB—IVB in FIG. 4A.
Figure 4C:
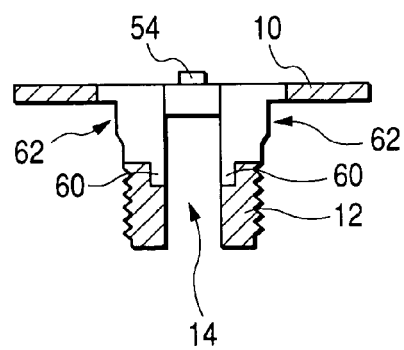
FIG. 4C is a section view taken along a line IVC—IVC in FIG. 4A.

As shown in FIGS. 4B and 4C, a mount screw 12 is formed with a slit 14 and recesses 60 which allow the engaging arms 50 to move outward in the width direction of the slit 14. Further, as shown in FIGS. 4A and 4C, an antenna base 10 is formed with recesses at both sides of the mount screw 12 so as to allow the holder arms 35 to move outward, thereby forming through holes 62 on the mount screw 12 at both sides of the slit 14. Projections 54 are formed for fixing the holder 32 on a top face of the antenna base 10 by caulking or the like. When the holder 32 is fixed to an antenna base 10 by the projections 54, the hooks 52 are placed at a center position of a mount screw 12 in an axial direction thereof as shown in FIGS. 1A and 1B.

Figure 5A:
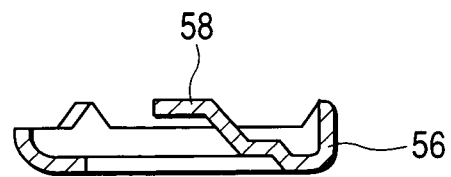
FIG. 5A is a section view of a washer in the antenna mounting structure of FIG. 1A.
Figure 5B:
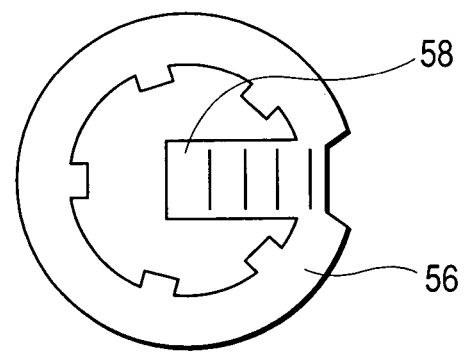
FIG. 5B is a plan view of the washer of FIG. 5A.

As shown in FIGS. 5A and 5B, a washer 56 is formed with an engaging piece 58 such that a distal end is situated above a main body of the washer 56. A lower end of each of the hooks 52 is tapered, so that the engaging piece 58 is allowed to be inserted into the slit 14 from below while elastically deforming the engaging arms 50 outward. On the other hand, an upper end of each of the hooks 52 is made flat, so that the inserted engaging piece 58 is prevented from deforming the engaging arms 50 and moving downward to establish a provisional fixation state.

Figure 6A:
FIG. 6A is a section view of the nut.
Figure 6B:
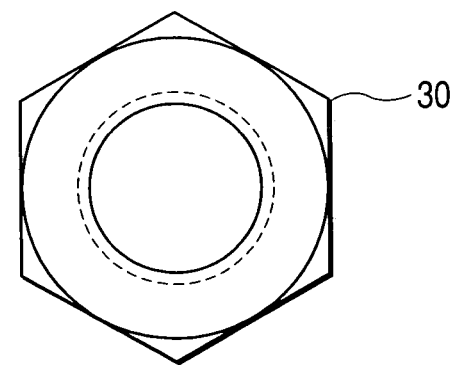
FIG. 6B is a plan view of the nut.
Figure 7A:
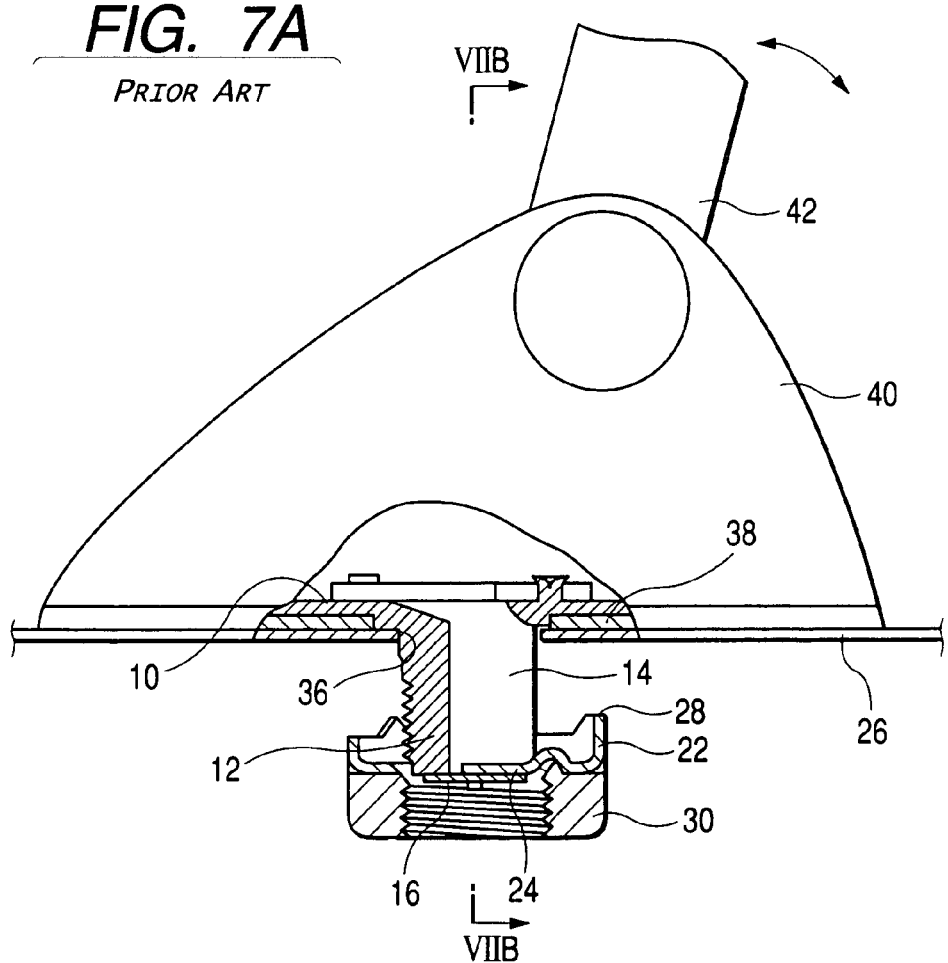
FIG. 7A is a partial section view of a related-art antenna mounting structure, showing a state that a nut is provisionally fixed with respect to a mount screw.
Figure 7B:
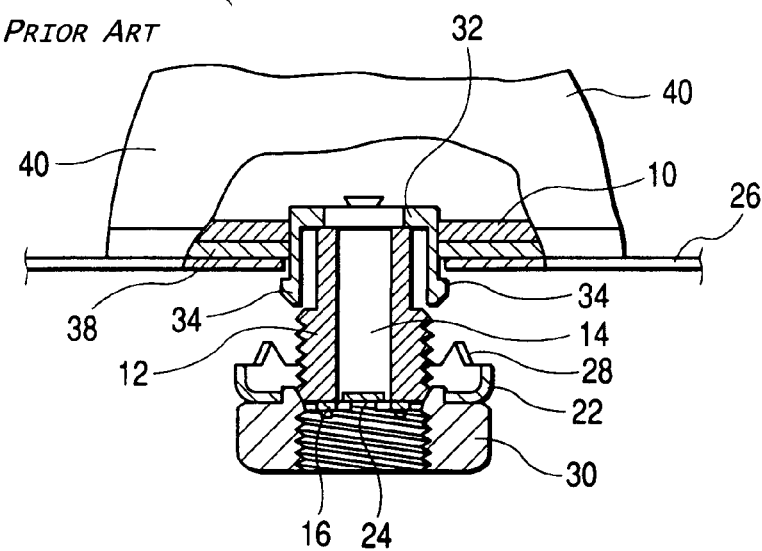
FIG. 7B is a partial section view taken along a line VIIB—VIIB in FIG. 7A.
Figure 8:
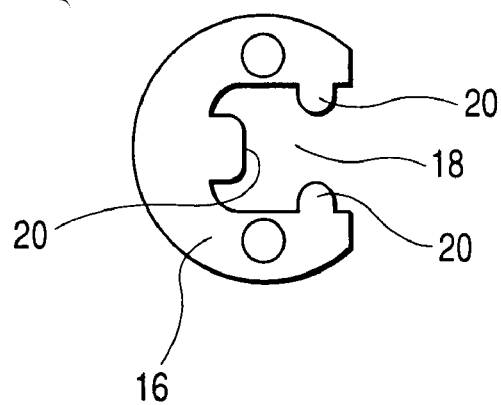
FIG. 8 is a plan view of an engaging plate in the antenna mounting structure of FIG. 7A.
Figure 9A:
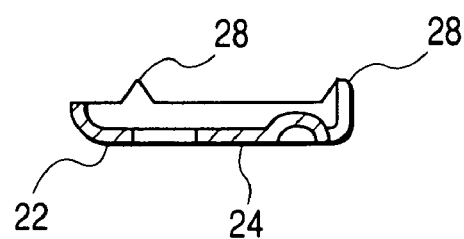
FIG. 9A is a section view of a washer in the antenna mounting structure of FIG. 7A.
Figure 9B:
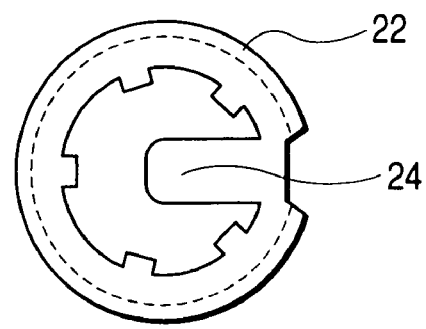
FIG. 9B is a plan view of the washer of FIG. 9A.

A nut 30 shown in FIGS. 6A and 6B is coupled to the washer 56 so as to be relatively rotatable around the screw axis and not to be separated from each other in the direction of the screw axis. Moreover, an unthreaded portion is provided on the lower end of the mount screw 12, so that the nut 30 can be fitted with the unthreaded portion without screwing the nut 30 to the mount screw 12.

In this embodiment, it is configured that the nut 30 is fitted into the unthreaded portion of the mount screw 12 under the condition that the engaging piece 58 of the washer 56 is engaged with the hooks 52. Accordingly, under the provisional fixation state, the nut 30 will not move in the lateral direction relative to the mount screw 12, thereby preventing the engaging piece 58 being slipped off from the slit 14. As a result, the nut 30 in the provisional fixing state will not be removed from the mount screw 12.

In this embodiment, since the engaging piece 58 of the washer 56 is hung on the hooks 52 of the engaging arms 50 while the nut 30 is fitted into the lower end portion (the unthreaded portion) of the mount screw 12, the alignment of the axes of the nut 30 and the mount screw 12 can be easily and reliably attained when the subsequent screwing operation is smoothly performed to obtain a plenary fixation state shown in FIG. 2.

In this embodiment, since the engaging arms 50 are monolithically formed with the holder 32 by resin molding, the engaging piece 58 is reliably retained by the holder 32 without increasing the number of components. However, the holder 32 and the engaging arms 50 may be provided as individual members.

The position at which the engaging piece 58 is retained by the hooks 52 to establish the provisional fixation state may be arbitrary determined only if the nut 30 is fitted with the lower end of the mount screw 12. For example, it may be a lower end portion of the mount screw 12 in the axial direction thereof.

In this embodiment, the unthreaded portion is provided on the lower end of the mount screw 12. However, the unthreaded portion may be formed on an upper end of the nut 30.

The structure of the hooks 52 may be suitably determined only if the engaging piece 58 is prevented from moving downward. For example, a pair of engaging arms may be extended upward from both sides of the slit 14 so as to reduce an interval therebetween. In such a configuration, the engaging piece 58 inserted into the slit 14 from below while elastically deforming the engaging arms outwards, and retained by upper end portions of the restored engaging arms.

There may be adopted a washer having no claw if the electrical connection of the antenna base 10 and the roof panel 26 is not required.

The mount hole 36 may be provided on a trunk panel to mount the antenna device on the trunk part of a vehicle.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A structure for mounting an antenna device on a first side of a panel body, the structure comprising:
    a mount screw, protruded from the antenna device so as to extend to a second side of the panel body through an opening formed in the panel body, the mount screw being formed with a slit extending from a distal end face thereof in an axial direction thereof;
    a washer, comprising a main body and a first engagement member extended from the main body, the washer being adapted to be fitted with the mount screw such that the first engagement member is inserted into the slit from the distal end face of the mount screw in a first direction;
    a second engagement member, provided in the slit, and being elastically deformable so as to allow the first engagement member to move within the slit in the first direction, the second engagement member being adapted to engage with the first engagement member at a first position within the slit so as to prevent the first engagement member from moving in a second direction which is opposite to the first direction; and
    a nut, adapted to be screwed to the mount screw while being interconnected with the washer.

2. The structure as set forth in claim 1, wherein a distal end of the first engagement member is situated at a position closer to the panel body than a face of the main body facing the panel body.

3. The structure as set forth in claim 1, wherein the second engagement member comprises:
    a pair of arm members, being deformable elastically in a third direction which is orthogonal to the first direction and the second direction;
    and a hook member, provided at a distal end portion of each of the arm members having a face extending in the third direction to retain the first engagement member at the first position.

4. The structure as set forth in claim 1, wherein the nut and the mount screw is partially fitted to each other when the first engagement member is retained at the first position.

5. The structure as set forth in claim 1, further comprising a holder fitted into the opening to prevent the antenna device from slipping off the panel body, wherein the second engagement member is monolithically formed with the holder.

6. A mounting device, comprising:
    a mount screw extending through an opening formed in a body along a first direction, the mount screw having a slit extending along an axial direction of the mount screw to expose an interior of the mount screw;
    a first engagement member disposed along a circumferential direction of the mount screw and having an engaging piece disposed within the slit to extend into the interior of the mount screw;
    a second engagement member disposed through the opening formed in the body within the interior of the mount screw along a second direction opposite to the first direction, the second engagement member having a distal end that engages the first member at a first position within the interior of the mount screw; and
    a nut attached to the mount screw.

7. The device as set forth in claim 6, wherein a distal end of the first engagement member disposed within the interior of the mount screw is situated at a position closer to the body than the distal end of the second engagement member.

8. The device as set forth in claim 6, wherein the second engagement member comprises:
    a first hook member provided at the distal end of the second engagement member to retain the first engagement member at the first position.

9. The device as set forth in claim 8, wherein the second engagement member comprises:
    a second hook member provided at a position between the distal end of the second engagement member and the opening of the body to engage a circumferential portion of the opening of the body.

10. The device as set forth in claim 8, wherein a nut and the mount screw are partially fitted to each other when the first engagement member is retained by the second engagement member at the first position.

11. The device as set forth in claim 10, wherein the engaging piece of the first engagement member traverses along the first direction within the second engagement member when the nut and the mount screw are completely fitted together.

12. The device as set forth in claim 6, further comprising:
    an antenna base; and
    a holder, coupled to the antenna base and fitted into the opening to prevent the antenna base from slipping off the body.

13. The device as set forth in claim 12, wherein the second engagement member is monolithically formed with the holder.

* * * * *